US007017704B2

(12) United States Patent
Kapaan et al.

(10) Patent No.: US 7,017,704 B2
(45) Date of Patent: Mar. 28, 2006

(54) STEERING DEVICE FOR A DRIVE-BY-WIRE VEHICLE

(75) Inventors: Hendrikus Jan Kapaan, Nieuwegein (NL); Eduardus Gerardus Maria Holweg, Delft (NL); Alexander Jan Carel Vries, Tiel (NL)

(73) Assignee: SKF Engineering and Research Centre B.V., Nieuwegein (NL)

( * ) Notice: Subject to any disclaimer, the term of this patent is extended or adjusted under 35 U.S.C. 154(b) by 162 days.

(21) Appl. No.: 10/276,057

(22) PCT Filed: May 18, 2001

(86) PCT No.: PCT/NL01/00380

§ 371 (c)(1),
(2), (4) Date: Dec. 13, 2002

(87) PCT Pub. No.: WO01/87687

PCT Pub. Date: Nov. 22, 2001

(65) Prior Publication Data

US 2004/0012175 A1 Jan. 22, 2004

(30) Foreign Application Priority Data

May 18, 2000 (NL) .................................... 1015236
Jul. 6, 2000 (NL) .................................... 1015626

(51) Int. Cl.
*B62D 1/22* (2006.01)
*B62D 5/00* (2006.01)

(52) U.S. Cl. ....................................... 180/315; 180/402

(58) Field of Classification Search ................ 180/315, 180/333, 335, 336, 402, 405; 74/500.5, 501.6, 74/552, 554–558; B62D 1/22
See application file for complete search history.

(56) References Cited

U.S. PATENT DOCUMENTS

| | | | | |
|---|---|---|---|---|
| 4,729,254 | A | 3/1988 | Nogami et al. | |
| 4,743,883 | A | 5/1988 | Yoshimi et al. | |
| 5,365,803 | A * | 11/1994 | Kelley et al. | 74/484 R |
| 5,941,339 | A * | 8/1999 | Shimizu et al. | 180/444 |
| 6,039,142 | A * | 3/2000 | Eckstein et al. | 180/333 |
| 6,138,788 | A | 10/2000 | Bohner et al. | |
| 6,224,093 | B1 * | 5/2001 | Ochiai et al. | 280/731 |
| 6,227,327 | B1 * | 5/2001 | Nigrin et al. | 180/402 |
| 6,474,688 | B1 * | 11/2002 | Bogren et al. | 280/771 |
| 6,491,128 | B1 * | 12/2002 | Lehmann et al. | 180/315 |
| 6,804,593 | B1 * | 10/2004 | Kitano et al. | 701/41 |
| 2003/0066379 | A1 * | 4/2003 | Kobayashi et al. | 74/552 |
| 2003/0209381 | A1 * | 11/2003 | Menjak et al. | 180/402 |
| 2004/0108161 | A1 * | 6/2004 | Ohno | 180/315 |
| 2004/0129488 | A1 * | 7/2004 | Chernoff et al. | 180/333 |

FOREIGN PATENT DOCUMENTS

DE 196 24 686 A1 1/1997

(Continued)

*Primary Examiner*—Paul N. Dickson
*Assistant Examiner*—Laura B. Rosenberg
(74) *Attorney, Agent, or Firm*—Oliff & Berridge, PLC

(57) ABSTRACT

A steering device (1) for drive-by-wire functions in a vehicle comprises a base (2) which can be fixed to the vehicle interior at the location of the driver, and two steering grips (3, 4) at opposite sides of the base, which steering grips each can be gripped by a hand of the driver, said steering grips being coupled and being moveable with respect to the base in mutually opposite directions.

18 Claims, 3 Drawing Sheets

FOREIGN PATENT DOCUMENTS

| | | | |
|---|---|---|---|
| DE | 197 39 104 A1 | | 3/1999 |
| DE | 197 55 044 C1 | | 3/1999 |
| DE | 299 07 180 U1 | | 11/1999 |
| EP | 1316490 A2 | * | 6/2003 |

* cited by examiner

STEERING DEVICE FOR A DRIVE-BY-WIRE VEHICLE

The invention is related to a steering device for a drive-by-wire vehicle. Such vehicles have controls which are fully or partly operated by means of electric cables. Examples are the electric control of brakes, of the clutch and the gearbox ect. so as to avoid the use of hydraulic and/or mechanical control lines.

The steering function of a vehicle is usually fully mechanical, be it that electric or hydraulic power assisted steering is widely used. On the other hand, electrically operated steering devices have been proposed which are controllable by means of a joystick. Such joystick devices are more and more applied in e.g. aeroplanes. The application of such joystick devices in road vehicles seems however less acceptable to the average car driver. This is caused by the fact that the "feel" and control properties of a joystick are quite different from these associated with a conventional steering wheel.

The object of the invention is therefore to provide a steering device which is suitable for drive-by-wire applications, but which does not differ appreciably from the conventional steer wheel. This object is achieved by means of a steering device for drive-by-wire functions in a vehicle, said steering device comprising a base which can be fixed to the vehicle interior at the location of the driver, and two steering grips at opposite sides of the base, which steering grips each can be gripped by a hand of the driver, said steering grips being coupled and being moveable with respect to the base in mutually opposite direction. The base can either be fixed permanently or through a click-on system in the vehicle interior. Also, the base can be fixed to a moveable support, which can be changed between a left-hand drive or a right-hand drive position.

The steering device according to the invention does not provide the usual rotational steering movement of the conventional steering wheel, but instead provides opposite movements of a pair of handgrips. Thus, the driver of the car which is equipped with the steering device according to the invention can still grip the steering grips with both hands. Also, the driver can steer by gripping only one steering grip with one hand.

Moreover, as in the case of the conventional steering wheel, movements in opposite directions are imposed on the pair of steering grips, the movements of which to a large extend resemble the opposite rotational movements on the opposite sides of the convention steering wheel.

As a result, the driver does not have to adjust his normal driving habits too much, which would make the steering device according to the invention quite acceptable to the average driver.

In order to provide the driver with the normal "feel" of the conventional steering wheel, which "feel" provides useful information concerning car behaviour etc, the steering grips are moveable from their neutral position under the influence of a resistance device simulating steering resistance, e.g. a spring or an electric motor. Furthermore, at least one sensor is provided for sensing a movement of the handgrips, said sensor being in closed loop configuration with a steering control device.

The coupled movement of the steering grips may be obtained in several ways. For instance, the steering grips can be coupled by means of a tiltable lever, which at each end engages a respective steering grip, and which midway between said ends is pivotably connected to the base. The lever engages each steering grip through a slidable/pivotable connection.

The steering grips may be carried out with any convenient shape which enhances the driver comfort. For instance, each steering grip may have a straight or arc-shaped outer circumference. Also, each steering grip can have an arc-shaped rod, connected to a slide which is slidable supported on the base, the rod and slide of each steering grip being connected through a spoke.

Furthermore, the base carries a head-up screen or LCD screen for displaying vehicle control and performance data, telecommunication means e.g. telephone, route planning and an airbag.

With the aim of enhancing the proper use of the steering device of the invention, signalling means are provided for signalling a left-hand and a right-hand turn.

The steering grips may be movable in parallel, or at an angle with respect to each other. Each steering grip can be slidable along the base by means of a linear bearing e.g. a plain bearing. Said base may be used for other functions, and may comprise a display and operating buttons, e.g. for accelerating/decelerating shifting indicators, lighting, route planning, telephone. According to a further embodiment, each steering grip can be slidable according to a curved trajectory, the curved trajectory of each steering grip being formed according to a circular arc.

A hand rest can also form part of the base. This hand rest provides a convenient support for the hands of the driver, and also protects the handgrips from accidental actuation by means of the driver's knee.

In that case, each steering grip can have a tooth rack which is curved according to the circular arcs, pinions being rotatably accommodated in the base which engage the curved tooth racks.

The invention is also related to a combination comprising a steering device according to one of the preceding claims, and a mechanically operated backup system for controlling prime vehicle safety function, such as steering and braking in case of a power failure. According to a preferred embodiment, locking means are provided for locking the steering grips with respect to the base in the case of a power failure, said fixed base being linked to the backup system and being released from a fixed position to a rotatable position in the case of said power failure.

Also, the steering device may be applied in combination with a steering column structure comprising one or more foot pedals for e.g. acceleration and/or breaking.

The invention will now be described further with reference to an embodiment of the steering device according to the invention as shown in the drawings.

The steering device 1 according to the invention comprises a base 2 which can be fixed to the vehicle interior at the location of the driver. This connection can be permanent, but can also be carried out as a click-on connection. In the latter case, the steering device can be applied or taken away at will, and can also be applied at the left hand or right hand driver's seat in case the required provisions are available in the dashboard of the vehicle.

Moreover, the steering device 1 may be carried out as a retractable unit. Upon driving, the steering device may in that case be in its normal steering position. When a car is parked, the steering device can be retracted so as to enable a comfortable seating procedure.

The steering device 1 furthermore comprises left hand and right hand steering grips 3, 4 at opposite sides of the base. These steering grips 3, 4 can be gripped by the hands of a driver; also, the driver may of course exert a steering action by gripping a single steering grip with only one hand.

Figure 1:
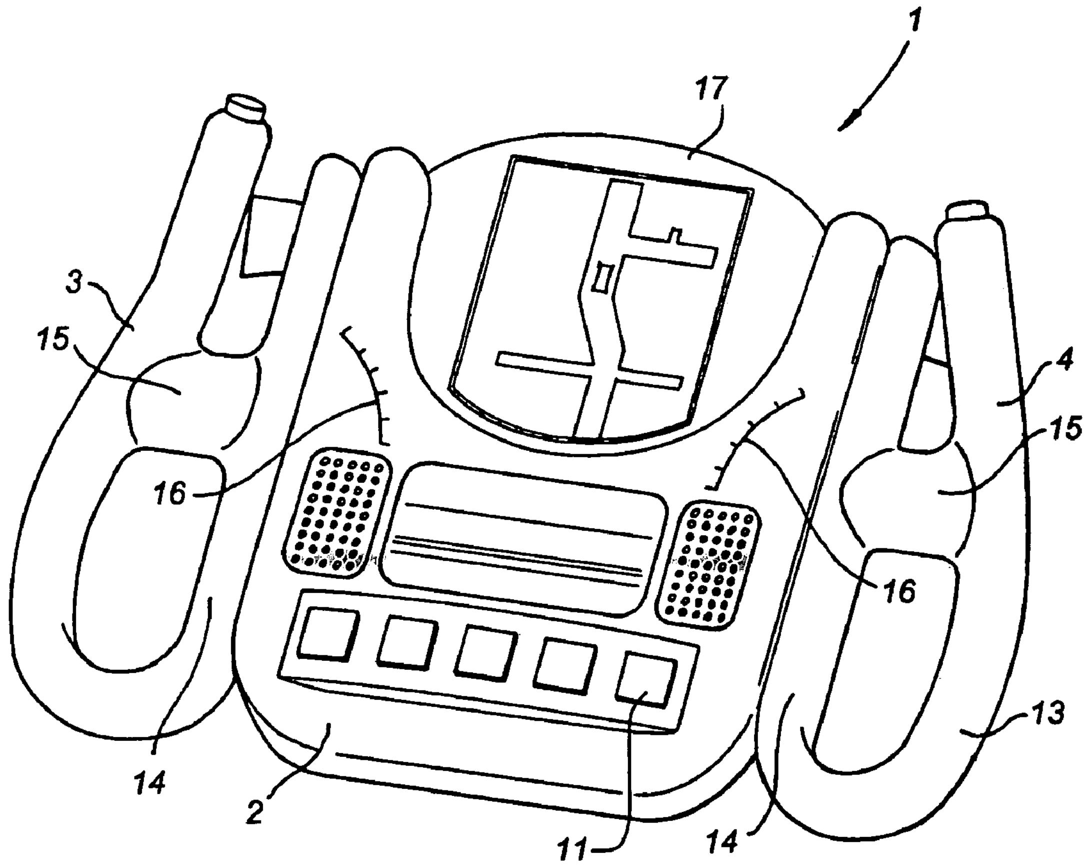
FIG. 1 shows a view in perspective of the steering device according to the invention.
Figure 2:
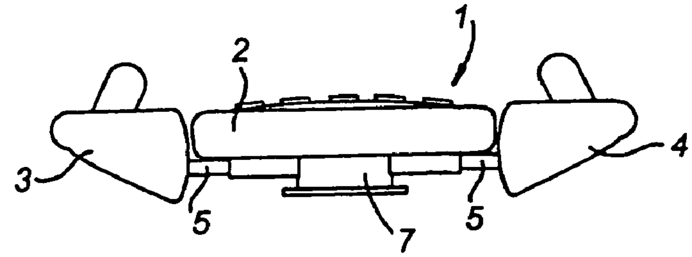
FIG. 2 shows a back view.
Figure 3:
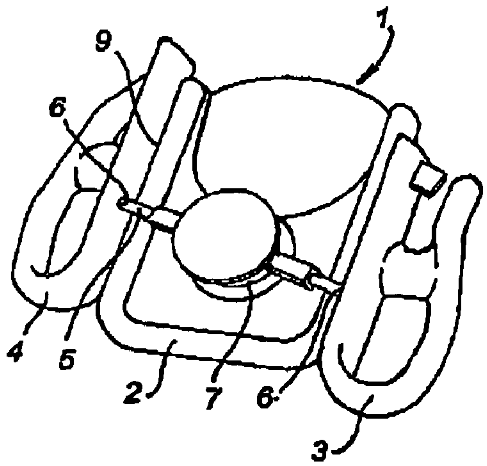
FIGS. 3–5 show views in perspective from the underside, with the steering grips in different positions.
Figure 4:
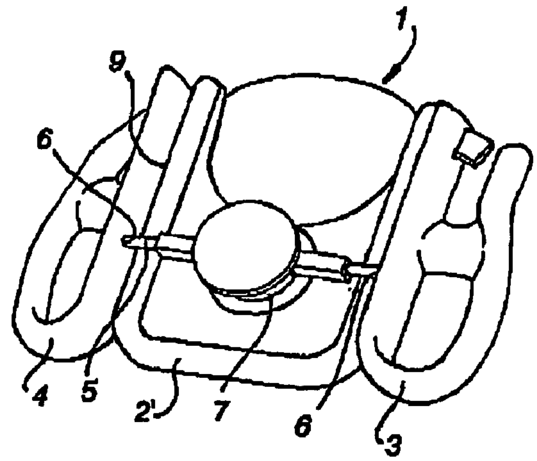
Figure 5:
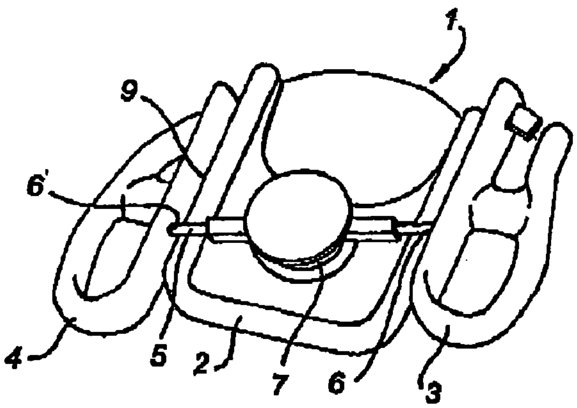

For carrying out the steering movements, the steering grips 3, 4 are slid along the base 2 in mutually opposite direction, as shown in the FIGS. 3–5.

To that end, the base 2 carries a pivot 7 by means of which the lever 5 can be pivoted into the different angular positions as shown in the FIGS. 3–5.

At its opposite ends, the lever 5 is engaging the steering grips 3. The connections 6 between the respective ends of the lever 5 and the steering grips 3, 4 allow relative displacements in the longitudinal direction of the lever 5.

In the embodiment shown, the steering grips 3, 4 each have an arch-shaped part, which by means of a spoke 15 is connected to the slide part 14. This slide part 14 is, in a manner known per se, e.g. by a linear bearing 9, connected to the base 2.

The base 2 furthermore comprises operating buttons 11 for carrying out several functions.

Moreover, signalling means 16 are provided which indicate the steering direction as carried out by the driver.

A route information planner is also installed on the base 2.

Alternatively, also an airbag may be provided.

Figure 6:
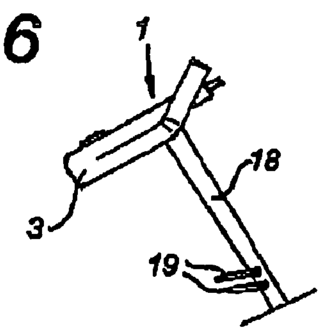
FIGS. 6, 7 and 8 show further embodiments.

In the embodiment of FIG. 6, the steering device 1 is combined with a steering support column structure 18, onto which also pedals 19, e.g. for accelerating or braking, are connected as a unity.

Figure 7:
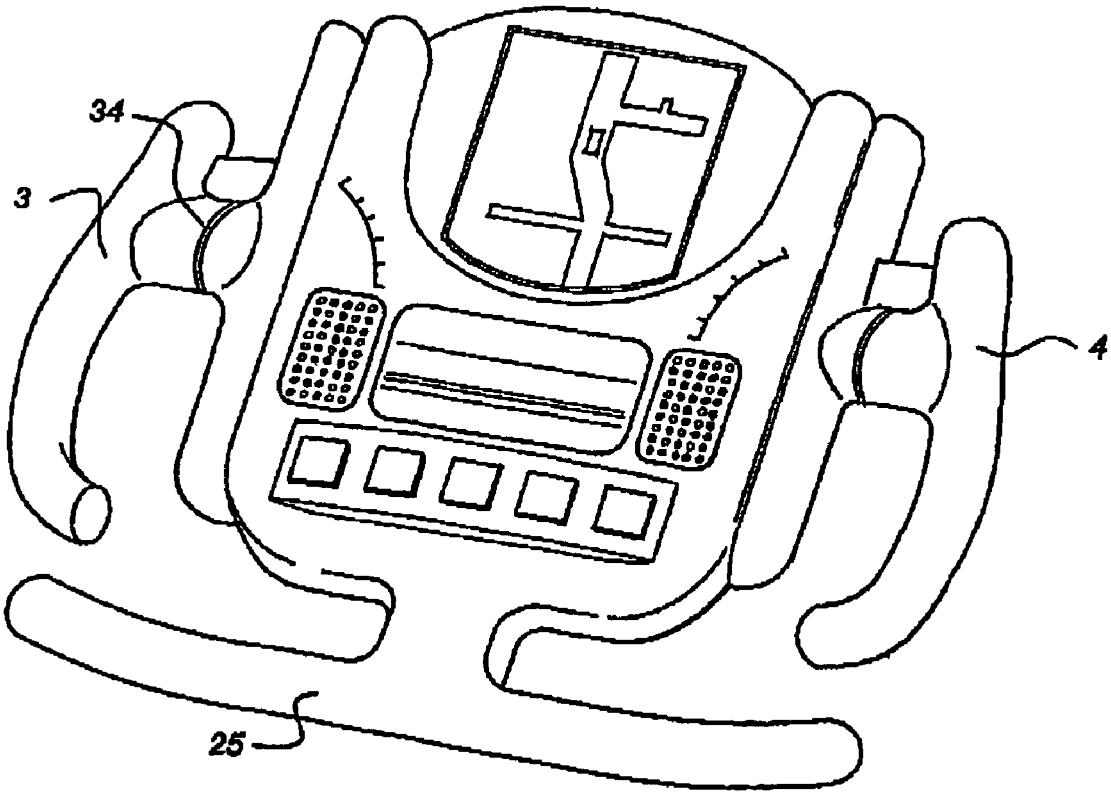

The embodiment of FIG. 7 has handgrips 3, 4 which are connected through a hinge 34. Moreover, a hand rest 25 is provided.

Figure 8:
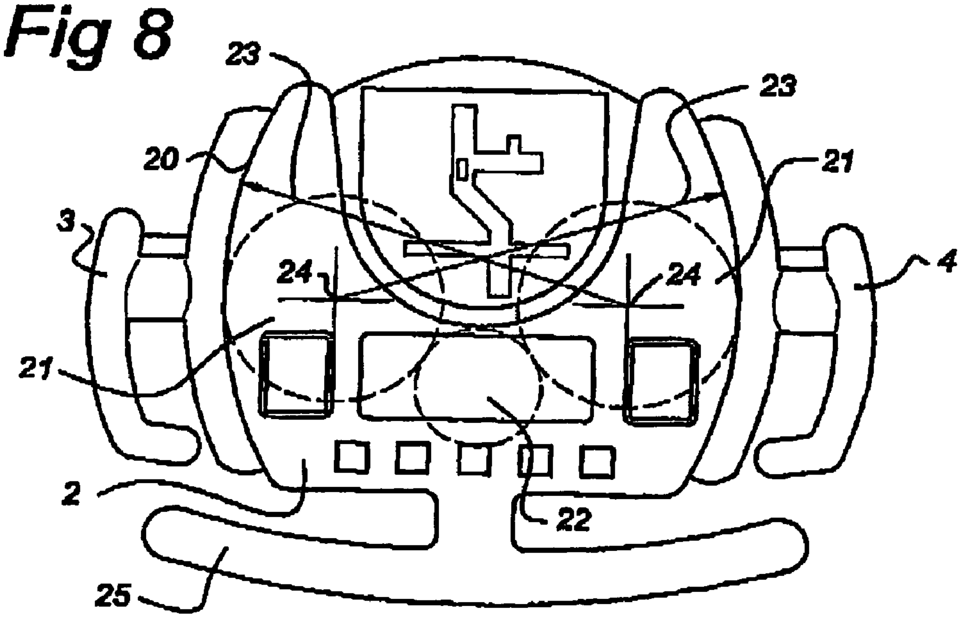

The further embodiment of FIG. 8 comprises handgrips 3, 4 which are slideable along the base 2 according to curved trajectories, which form part of a circular arc in the embodiment shown. The radii 23 of these circular arcs are larger than the mutual distance thereof. The centrepoints of these curved trajectories are indicated at 24.

Each hand grip 3, 4 at its side facing the base 2 has an accordingly curbed tooth rack 20 (not shown), which each engage the schematically shown pinions 21. These pinions 21 are rotatably accommodated in the base 2 according to an axis at the centrepoint 24 of the curbed trajectories. Each pinion 21 engages a central tooth wheel 22 which is connected to a steering control (not shown).

As a result of the engagement of tooth racks, pinions 21 and tooth wheel 22, the movement of the hand grips 3, 4 is linked, that is an upward movement of one of the steering grips 3, 4 automatically leads to a corresponding downward movement of the other of the steering grips 3, 4.

Moreover, the tooth wheel 21 can be connected to an electric motor for simulating steering resistance.

Furthermore, means may be provided which lock the steering grips 3, 4 with respect to the base 2 in the case of a power failure. Also, means may be provided which release to the base 2 from its fixed position, so as to make it rotatable around a backup steering axis in such case of power failure. As a result, the steering device according to the invention can be used as a usual steering wheel, gripped at the steering grips 3, 4, when a power failure occurs.

What is claimed is:

1. Steering device for drive-by-wire functions in a vehicle, comprising a base which can be fixed to a vehicle interior at a location of a driver, and two steering grips at opposite sides of the base, which steering grips each can be gripped by a hand of the driver, said steering grips being coupled and being moveable with respect to the base in mutually opposite directions, each steering grip being moveable along a curved trajectory formed according to a circular arc for each steering grip, characterized in that the distance between the curved trajectories is smaller than a sum of a radius of the circular arc of each curved trajectory.

2. Steering device according to claim 1, wherein the steering grips are slidable from a neutral position under the influence of a resistance device simulating steering resistance, the resistance device being at least one of a spring and/or an electric motor and/or hydraulic means.

3. Steering device according to claim 1, wherein at least one sensor is provided for sensing a movement of the handgrips, said sensor being in closed loop configuration with a steering control device.

4. Steering device according to claim 1, wherein at least one of the base and/or the steering grips comprise(s) a display and operating buttons, for at least one of accelerating/decelerating, gear shifting, shifting indicators, lighting, route planning and telecommunications means.

5. Steering device according to claim 1, wherein the base comprises an airbag.

6. Steering device according to claim 1, wherein each steering grip has a straight or arc-shaped outer circumference.

7. Steering device according to claim 1, wherein each steering grip has an arc-shaped rod, connected to a slide which is slidably supported on the base.

8. Steering device according to claim 7, wherein the rod and slide of each steering grip are connected through a spoke.

9. Steering device according to claim 1, wherein the base carries a head-up screen or LCD screen for displaying at least one of vehicle control performance data, and telecommunication.

10. Steering device according to claim 1, wherein signalling means is provided for signaling a left-hand turn and a right-hand turn.

11. Steering device according to claim 1, wherein the steering grips are moveable according to trajectories which are non-parallel.

12. Steering device according claim 1, wherein each steering grip has a tooth rack which is curved according to the circular arcs, pinions being rotatably accommodated in the base which engage the curved tooth racks.

13. Steering device according to claim 12, wherein the pinions each engage a central tooth wheel, said central tooth wheel being connectable to a steering control.

14. Steering device according to claim 1, wherein the base comprises a hand rest which extends past the hand grips.

15. In combination, a steering device according to claim 1, and a mechanically operated backup system for controlling prime vehicle safety functions.

16. Combination according to claim 15, wherein a lock is provided for locking the steering grips with respect to the base in the case of a power failure, said base being linked to the backup system and being released from a fixed position to a rotatable position in the case of said power failure.

17. In combination, a steering device according to claim 1, and a steering column structure comprising at least one foot pedal for at least one of acceleration and braking.

18. Combination according to claim 17, wherein the steering column structure comprises electric lines and a connector for connection to a vehicle electronics controller.

* * * * *